United States Patent
Roylance et al.

(10) Patent No.: US 9,794,387 B1
(45) Date of Patent: Oct. 17, 2017

(54) AUTOMATICALLY ESTABLISHING A COMMUNICATION SESSION ASSOCIATED WITH AN EVENT

(71) Applicant: Sorenson IP Holdings, LLC, Salt Lake City, UT (US)

(72) Inventors: Shane A. Roylance, Farmington, UT (US); Brian Chevrier, Highland, UT (US); Josh Allison, West Jordan, UT (US)

(73) Assignee: Sorenson IP Holdings, LLC, SLC, UT (US)

( * ) Notice: Subject to any disclaimer, the term of this patent is extended or adjusted under 35 U.S.C. 154(b) by 0 days.

(21) Appl. No.: 15/377,808

(22) Filed: Dec. 13, 2016

(51) Int. Cl.
*H04M 1/247* (2006.01)
*H04M 1/274* (2006.01)
*H04M 1/82* (2006.01)
*H04M 1/2745* (2006.01)

(52) U.S. Cl.
CPC ..... *H04M 1/274575* (2013.01); *H04M 1/247* (2013.01); *H04M 1/82* (2013.01); *H04M 2201/42* (2013.01); *H04M 2203/2072* (2013.01); *H04M 2242/18* (2013.01); *H04M 2242/28* (2013.01); *H04M 2250/66* (2013.01)

(58) Field of Classification Search
None
See application file for complete search history.

(56) References Cited

U.S. PATENT DOCUMENTS

| | | | | |
|---|---|---|---|---|
| 3,701,855 A * | 10/1972 | Reynolds | ............... | H04Q 3/545 379/157 |
| 6,167,130 A * | 12/2000 | Rosen | ............. | H04M 1/274575 379/216.01 |
| 2002/0159582 A1* | 10/2002 | Dendy | .................... | H04M 3/44 379/352 |
| 2002/0176404 A1* | 11/2002 | Girard | ............... | H04M 3/42153 370/352 |
| 2003/0215077 A1 | 11/2003 | Hagiwara | | |

(Continued)

FOREIGN PATENT DOCUMENTS

WO 2013/165099 A1 11/2013
WO 2015/148225 A2 10/2015

OTHER PUBLICATIONS

How to get Reminder for Scheduled Phone Call?, website: https://www.odoo.com/forum/help-1/question/how-to-get-reminder-for-scheduled-phone-call-9871, retrieved Sep. 16, 2016, 8 pages.

(Continued)

*Primary Examiner* — Harry S Hong
(74) *Attorney, Agent, or Firm* — Maschoff Brennan

(57) ABSTRACT

A method for automatically making a telephone call associated with an event may include accessing, at a telephone, event data. The event data may include a date associated with an event, a time associated with the event, and a telephone number associated with the event. The method may also include presenting, on a display associated with the telephone, an event reminder on the date associated with the event and at the time associated with the event. The method may also include, in response to detecting an off-hook condition at the telephone while the event reminder remains presented on the display associated with the telephone, automatically calling, from the telephone, the telephone number associated with the event.

17 Claims, 3 Drawing Sheets

(56) References Cited

U.S. PATENT DOCUMENTS

| | | |
|---|---|---|
| 2005/0272408 A1 | 12/2005 | Wilkes-Gibbs et al. |
| 2007/0269024 A1* | 11/2007 | Dalrymple ............ H04M 11/04 379/37 |
| 2009/0198784 A1 | 8/2009 | Bergius |
| 2014/0177815 A1 | 6/2014 | Bhow |
| 2014/0341087 A1 | 11/2014 | Kalpathy Narayanan |
| 2015/0094042 A1 | 4/2015 | Kaplan et al. |
| 2015/0348396 A1 | 12/2015 | Sattari |
| 2015/0379479 A1 | 12/2015 | Nagaraj |
| 2016/0072994 A1 | 3/2016 | Takai |
| 2016/0248637 A1 | 8/2016 | Baldassari et al. |

OTHER PUBLICATIONS

Send Appointment Reminders from your existing software!, website: https://www.remindercall.com/, retrieved Sep. 16, 2016, 9 pages.

Appointment Reminder, website: https://www.appointmentreminder.org/, retrieved on Sep. 16, 2016, 2 pages.

* cited by examiner

AUTOMATICALLY ESTABLISHING A COMMUNICATION SESSION ASSOCIATED WITH AN EVENT

FIELD

The embodiments discussed herein are related to automatically establishing a communication session associated with an event.

BACKGROUND

A communication session between two or more users enables the users to interact with one another while being located remotely from one another. For example, when a user's granddaughter has a birthday, the user may call the granddaughter to wish her a happy birthday without having to travel to the physical location of the granddaughter. Similarly, when a user has an appointment with a doctor, the user may call the doctor to discuss medical concerns with the doctor without having to travel to the physical location of the doctor. A communication session, therefore, may enable a user to participate in certain events, such as birthday celebrations and doctor appointments, without having to travel to a remote location for the event.

The subject matter claimed herein is not limited to embodiments that solve any disadvantages or that operate only in environments such as those described above. Rather, this background is only provided to illustrate one example technology area where some embodiments described herein may be practiced.

SUMMARY

A method for automatically making a call associated with an event may include accessing, at a telephone, event data. The event data may include a date associated with an event, a time associated with the event, and a telephone number associated with the event. The method may also include presenting, on a display associated with the telephone, an event reminder on the date associated with the event and at the time associated with the event. The method may also include, in response to detecting an off-hook condition at the telephone while the event reminder remains presented on the display associated with the telephone, automatically calling, from the telephone, the telephone number associated with the event.

BRIEF DESCRIPTION OF THE DRAWINGS

Example embodiments will be described and explained with additional specificity and detail through the use of the accompanying drawings in which.

DESCRIPTION OF EMBODIMENTS

Figure 1:
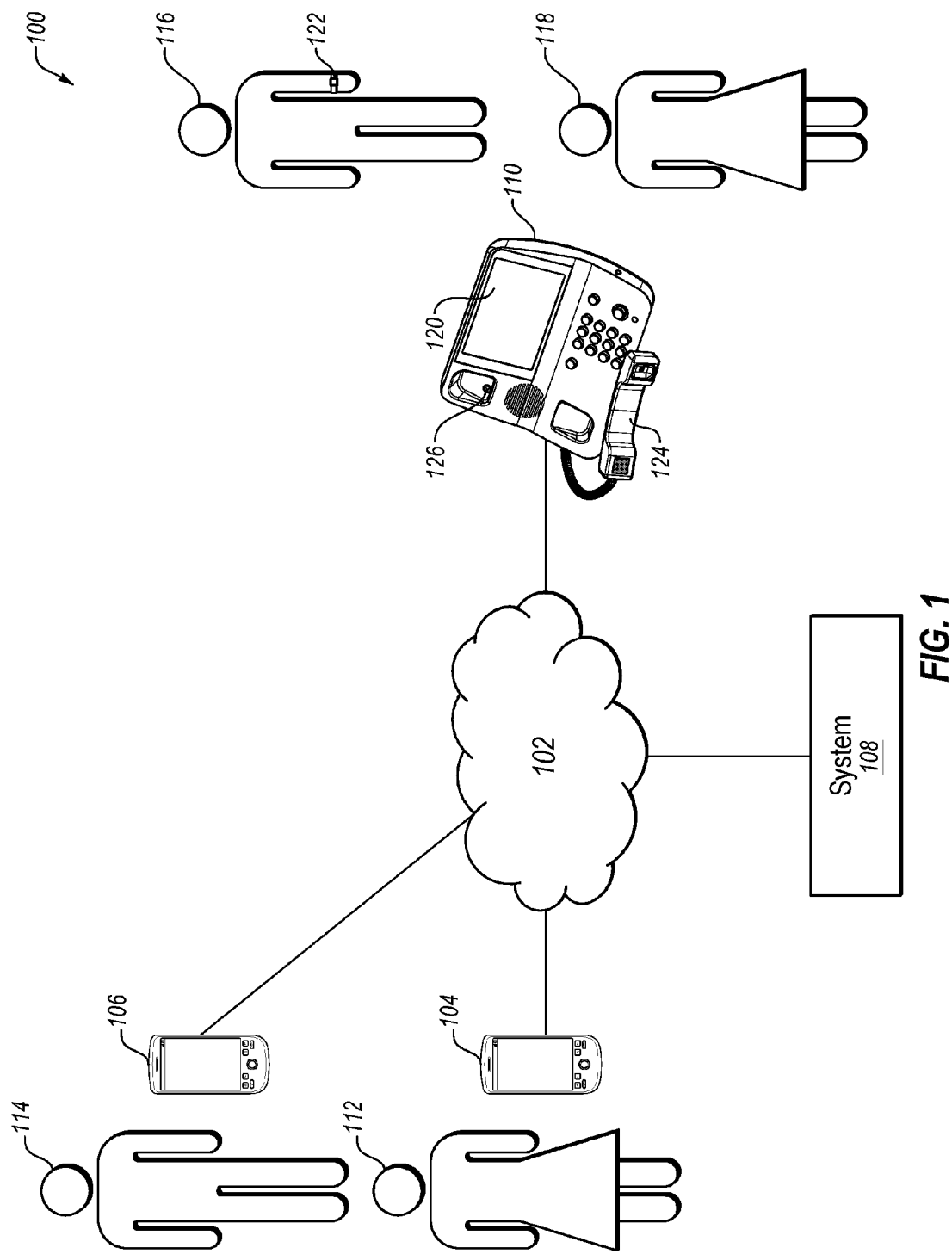
FIG. 1 illustrates an example communication system configured to automatically establish a communication session associated with an event.

Some embodiments in this disclosure relate to systems and methods that may be configured to automatically establish a communication session associated with an event. In at least some embodiments, the systems or methods disclosed herein may, for example, automatically remind a user of an event and then automatically make a telephone call associated with the event in order to enable the user to participate in the event remotely.

One common problem for telephone users is remembering dates and times of reoccurring or one-time events, such as birthdays and doctor appointments. For example, a user may wish to call her granddaughter each year on her birthday in order to wish her granddaughter a happy birthday without having to travel to the remote home of her granddaughter. However, remembering to call her granddaughter on her birthday each year may be difficult for the user, especially where the user is older and has diminished memory capabilities. Similarly, another user may wish to call his doctor each time he has a scheduled appointment with the doctor to receive advice for his medical condition without having to travel to the office of his doctor. However, remembering to call his doctor each time he has an appointment may be difficult for the user, especially where the user is older and has diminished memory capabilities.

The systems and methods disclosed herein may provide various benefits. In particular, the systems and methods disclosed herein may remind a user of an event and then automatically make a phone call associated with the event in order to enable the user to participate in the event remotely. For example, in some embodiments, an event reminder may be presented on a display associated with a telephone, and a telephone number associated with the event may be called automatically in response to detecting an off-hook condition at the telephone. In this manner, the user may be automatically enabled to participate in the event, without having to travel to a remote location for the event, for example, by simply removing a handset of the telephone from the switch hook of the telephone while the event reminder remains presented on the display associated with the telephone, and without requiring the user to manually dial the telephone number associated with the event. Continuing with the examples noted above, the systems and methods disclosed herein may remind the user of her granddaughter's birthday on a display associated with a telephone and then automatically call the granddaughter when the user removes the handset of the telephone from the switch hook of the telephone, or may remind the user of his doctor appointment on the display associated with the telephone and then automatically call the doctor when the user removes the handset of the telephone from the switch hook of the telephone. In both examples, simply removing the handset of the telephone from the switch hook of the telephone while the event reminder remains presented on the display associated with the telephone results in the telephone automatically making a phone call to a telephone number associated with the event without requiring the user to manually dial the telephone number associated with the event.

Turning to the figures, FIG. 1 illustrates an example communication system 100 configured to automatically establish a communication session associated with an event. The system 100 may be arranged in accordance with at least one embodiment described in the present disclosure. The system 100 may include a network 102, a device 104, a device 106, a system 108, and a telephone 110.

The network 102 may be configured to communicatively couple the device 104, the device 106, the system 108, and the telephone 110. In some embodiments, the network 102 may be any network or configuration of networks configured to send and receive communications between systems and devices. In some embodiments, the network 102 may include a conventional type network, a wired or wireless network, and may have numerous different configurations. In some embodiments, the network 102 may also be coupled to or may include portions of a telecommunications network, including telephone lines, for sending data in a variety of different communication protocols, such as a plain old telephone system (POTS).

Each of the devices 104 and 106 and the telephone 110 may be any electronic or digital computing device. For example, each of the devices 104 and 106 and the telephone 110 may include a desktop computer, a laptop computer, a smartphone, a mobile phone, a tablet computer, a telephone, a phone console, or any other computing device. In some embodiments, each of the devices 104 and 106 and the telephone 110 may be configured to establish communication sessions with other devices. For example, each of the devices 104 and 106 and the telephone 110 may be configured to establish an outgoing telephone call with another device over a telephone line or network. For example, the devices 104 and 106 may communicate over a wireless cellular network and the telephone 110 may communicate over a public switch telephone network (PSTN) line. Alternatively or additionally, the devices 104 and 106 and the telephone 110 may communicate over other wired or wireless networks that do not include or only partially include a PSTN. For example, a telephone call or communication session between one or both of the devices 104 and 106 and the telephone 110 may be a voice-over internet protocol (VOIP) telephone call. As another example, the communication session between one or both of the devices 104 and 106 and the telephone 110 may be a video communication session or other communication session.

Alternately or additionally, each of the devices 104 and 106 and the telephone 110 may be configured to communicate with other systems over a network, such as the network 102 or another network. In these and other embodiments, the devices 104 and 106 and the telephone 110 may receive data from and send data to the system 108. For example, the devices 104 and 106 and the telephone 110 may include memory and at least one processor, which are configured to perform operations as described in this disclosure, among other operations. In some embodiments, the devices 104 and 106 and the telephone 110 may include computer-readable instructions that are configured to be executed by the devices 104 and 106 and the telephone 110 to perform operations described in this disclosure.

In some embodiments, the system 108 may include any configuration of hardware, such as processors, servers, and databases that are networked together and configured to perform a task. For example, the system 108 may include multiple computing systems, such as multiple servers that each include memory and at least one processor, which are networked together and configured to perform operations of captioning communication sessions, such as telephone calls, between devices such as the telephone 110 and another devices as describe in this disclosure. In these and other embodiments, the system 108 may operate to caption audio generated by one or more parties in the communication session. For example, the system 108 may caption audio generated by other devices and not the telephone 110 or both the telephone 110 and other devices, among other configurations.

In some embodiments, the system 108 may operate as an exchange configured to establish communication sessions, such as telephone calls, video calls, etc. between devices such as the telephone 110 and another device or devices as described in this disclosure, among other operations. In some embodiments, the system 108 may include computer-readable instructions that are configured to be executed by the system 108 to perform operations described in this disclosure.

Further, in some embodiments, the system 100 may be configured to facilitate an assisted communication session between a hearing-impaired user 116 or a hearing-impaired user 118 (such as a husband and wife who share a single telephone 110) and a second user, such as the user 112 or the user 114. As used in the present disclosure, a "hearing-impaired user" may refer to a person with diminished hearing capabilities. Hearing-impaired users often have some level of hearing ability that has usually diminished over a period of time such that the hearing-impaired user can communicate by speaking, but that the hearing-impaired user often struggles in hearing and/or understanding others.

In some embodiments, the assisted communication session may be established between a device such as the device 104 or the device 106 and the telephone 110. In these embodiments, the telephone 110 may be a captioning telephone that is configured to present captions of the communication session to the hearing-impaired user 116 or the hearing-impaired user 118, such as one of the CaptionCall® 57T model family or 67T model family of captioning telephones or a device running the CaptionCall® mobile app. For example, in some embodiments, the telephone 110 may include a visual display 120 that is integral with the telephone 110 and that is configured to present text captions of a communication session to the hearing-impaired user 116 or the hearing-impaired user 118. In these and other embodiments, the telephone 110 may be configured for use by multiple hearing impaired users using user profiles. For example, the telephone may be configured with a first user profile corresponding to the hearing-impaired user 116 and with a second user profile corresponding to the hearing-impaired user 118. Each user profile may include settings that are specific to the corresponding user, such as text size on the visual display 120, volume of the telephone 110, or user-specific ring-tones of the telephone 110, among other settings.

Alternatively or additionally, the telephone 110 may be associated with a visual display that is physically separate from the telephone 110 and that is in wireless communication with the telephone 110, such as a visual display of a wearable device 122 worn on the wrist of the hearing-impaired user 116 and configured to be in BlueTooth® wireless communication with the telephone 110. Other physically separate physical displays may be visual displays of desktop computers, laptop computers, smartphones, mobile phones, tablet computers, or any other computing devices that are in wireless communication with the telephone 110.

The telephone 110 may also include a handset 124 and a switch hook 126.

During a captioning communication session, the system 108 and the device 104 or the device 106 and the telephone 110 may be communicatively coupled using networking protocols. In some embodiments, during the communication session between the device 104 or the device 106 and the telephone 110, the telephone 110 may provide the audio signal from the device 104 or the device 106 to the system 108.

At the system 108, the audio signal may be transcribed. In some embodiments, to transcribe the audio signal, a call assistant may listen to the audio signal received from the device 104 or the device 106 and "revoice" the words of the user 112 or the user 114 to a speech recognition computer program tuned to the voice of the call assistant. In these and other embodiments, the call assistant may be an operator who serves as a human intermediary between the hearing-impaired user 116 or the hearing-impaired user 118 and the user 112 or the user 114. In some embodiments, text captions may be generated by a speech recognition computer as a transcription of the audio signal of the user 112 or the user 114. The text captions may be provided to the telephone 110 being used by the hearing-impaired user 116 or the hearing-impaired user 118 over the network 102. The telephone 110 may display the text captions while the hearing-impaired user 116 or the hearing-impaired user 118 carries on a normal conversation with the user 112 or the user 114. The text captions may allow the hearing-impaired user 116 or the hearing-impaired user 118 to supplement the voice signal received from the device 104 or the device 106 and confirm his or her understanding of the words spoken by the user 112 or the user 114.

Modifications, additions, or omissions may be made to the communication system 100 without departing from the scope of the present disclosure. For example, in some embodiments, the user 112 or the user 114 may also be hearing-impaired. In these and other embodiments, the system 108 may provide text captions to the device 104 or the device 106 based on audio data transmitted by the telephone 110. Alternately or additionally, the system 108 may include additional functionality. For example, the system 108 may edit the text captions or make other alterations to the text captions after presentation of the text captions on the telephone 110. Alternately or additionally, in some embodiments, the system 100 may include additional devices similar to the devices 104 and 106 and the telephone 110. In these and other embodiments, the similar devices may be configured to automatically establish a communication session associated with an event.

Figure 2:
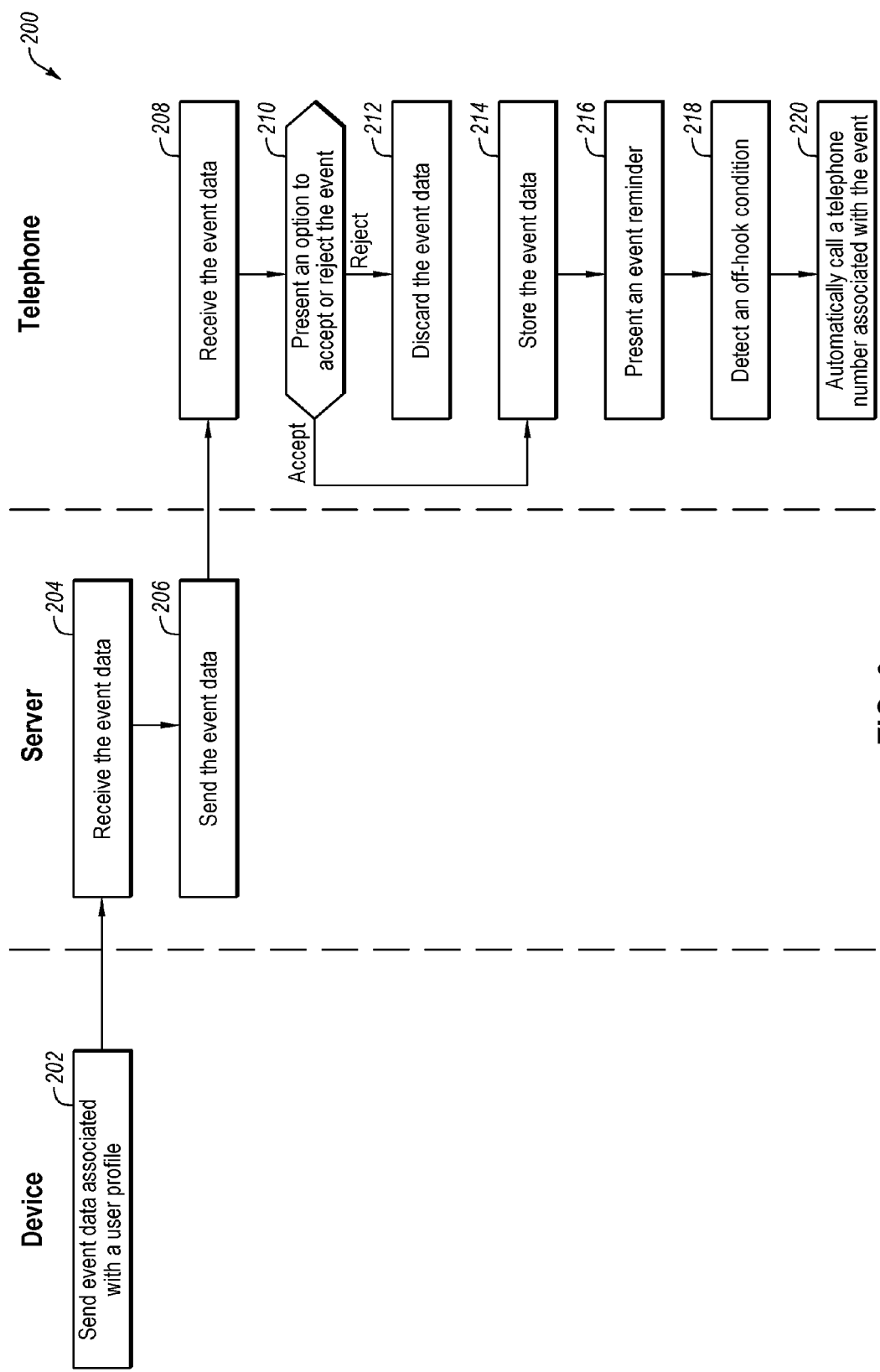
FIG. 2 is a flowchart of an example method for automatically establishing a communication session associated with an event.

FIG. 2 is a flowchart of an example method 200 for automatically establishing a communication session associated with an event. The method 200 may be arranged in accordance with at least one embodiment described in the present disclosure. The method 200 may be performed, in some embodiments, by a device or system, such as the devices 104 and 106, the telephone 110, the system 108, or another device or system. In these and other embodiments, the method 200 may be performed based on the execution of instructions stored on one or more non-transitory computer-readable media. Although illustrated as discrete blocks, various blocks may be divided into additional blocks, combined into fewer blocks, or eliminated, depending on the desired implementation. The method 200 will now be described in connection with FIGS. 1 and 2.

The method 200 may begin at block 202, where a third-party device may send event data associated with a user profile. In some embodiments, the event data may include a date associated with an event, a time associated with the event, a telephone number associated with the event, or a contact associated with the event, or may include some combination thereof In a birthday example, the user 112 may be a caregiver of the user 118, and the event may be the birthday of a granddaughter of the user 118. In this example, at block 202 the user 112 may use the device 104 to access a website of the system 108 over the network 102 and use the website to create the birthday of the granddaughter as the event associated with a user profile of the user 118. Using the website, the user 112 may enter event data associated with the birthday such as the date of the birthday, a convenient time of day on the birthday for a phone call, the granddaughter's telephone number, and a contact identifier of the granddaughter which identifies a contact of the granddaughter in a contact list of the user 118. Additionally or alternatively, the user 112 may use the device 104 to send the event data via an email, a text, an automated touch-tone system, a voice recognition system, or a conversation with a human operator, or via some combination thereof.

In a doctor appointment example, the user 114 may be the doctor of the user 116 or someone associated with the doctor, and the event may be a doctor appointment of the user 116. In this example, at block 202 the user 114 may use the device 106 to access the website discussed in the above birthday example to create the doctor appointment as the event associated with the user profile of the user 116. Using the website, the user 114 may enter event data associated with the doctor appointment such as the date of the doctor appointment, the time of the doctor appointment, the doctor's telephone number, and a contact identifier of the doctor which identifies a contact of the doctor in a contact list of the user 116. Additionally or alternatively, the user 114 may use the device 106 to send the event data via the other forms of communication mentioned in the above birthday example.

At block 204, a server may receive the event data. Then, at block 206, the server may send the event data. In some embodiments, the server may send the event data to a telephone associated with the user profile of the event data. In some embodiments, the server may additionally store the event data for future reference.

Continuing with the above birthday example and the above doctor appointment example, at block 204 the system 108 may receive the event data that was sent at block 202 and then at block 206 the system 108 may send the event data that was received at block 204 to the telephone 110 because the telephone 110 is associated with the user profile of the user 118 and is associated with the user profile of the user 116. In these examples, the users 116 and the user 118 may be a husband and wife that share the same telephone 110.

At block 208, the telephone may receive the event data. Then at block 210, the telephone may present an option to accept or reject the event. The option at block 210 may be presented on a display associated with the telephone that received the event data at block 208. The display may be a visual display that is integral with the telephone, or a visual display that is physically separate from the telephone and is in wireless communication with the telephone, or visual displays that are some combination thereof. The visual display that is integral with the telephone may be configured to present text captions. The visual display that is physically separate from the telephone may be a visual display of a wearable device.

Continuing with the above birthday example and the above doctor appointment example, at block 208 the telephone 110 may receive the event data that was sent at block 208, and then at block 210 the telephone 110 may present an option to accept or reject the birthday or doctor appointment on a display associated with the telephone 110, such as on the visual display 120 of the telephone 110 or on a display of the wearable device 122 that is in wireless communication with the telephone 110.

At block 212, in response to the option to reject the event being selected at block 210, the telephone may discard the event data. Continuing with the above birthday example and the above doctor appointment example, at block 212 the telephone 110 may discard the event data that was received at block 208 in response to the user 118 or the user 116 selecting, at block 210, the option to reject the birthday or the doctor appointment.

Alternatively, at block 214, in response to the option to accept the event being selected at block 210, the telephone may store the event data. The storing of the event data at block 210 may include associating the contact associated with the event with a contact in a contact list associated with the telephone.

Continuing with the above birthday example and the above doctor appointment example, at block 214 the telephone 110 may store the event data that was received at block 208 in response to the user 118 or the user 116 selecting, at block 210, the option to accept the birthday or the doctor appointment. Additionally or alternatively, the event data that was received at block 208 may be associated with a contact for the granddaughter or a contact for the doctor that is already stored in a contact list associated with the telephone 110, such as a contact list stored on the telephone 110 or stored on the system 108.

At block 216, the telephone may present an event reminder. In some embodiments, the presentation of the event reminder at block 216 may occur on the date associated with the event and at the time associated with the event. In some embodiments, the event reminder may be presented at block 216 on a display associated with the telephone. Additionally, the presentation of the birthday event reminder or the doctor appointment reminder at block 216 may include the telephone ringing with a ring that is specific to the event reminder on the date associated with the event and at the time associated with the event.

Continuing with the above birthday example and the above doctor appointment example, at block 216 the telephone 110 may present a reminder of the birthday or the doctor appointment on a display associated with the telephone 110, such as on the visual display 120 of the telephone 110 or on a display of the wearable device 122 that is in wireless communication with the telephone 110. The event reminder may be a text reminder giving event details of the birthday or the doctor appointment, a graphical reminder showing one or more graphics related to the birthday or doctor appointment such as a birthday cake and a picture of the granddaughter or a doctor symbol and a picture of the doctor, or any other visual reminder of the event. Additionally, the event reminder may include a vibration reminder such as a vibration of the handset 124 of the telephone 110 or a vibration of the wearable device 122, an audible reminder played through a speaker of the telephone 110 or played through a speaker of the wearable device 122, or a scent reminder generated by the telephone 110 or generated by the wearable device 122 or another device, or the event reminder may include some combination thereof.

Additionally, the presentation of the birthday event reminder or the doctor appointment reminder at block 216 may include the telephone 110 ringing with a ring that is specific to the birthday event reminder or to the doctor appointment reminder on the date associated with the birthday or doctor appointment and at the time associated with the birthday or doctor appointment. The ring that is specific to the birthday event reminder may be the same as or different from the ring that is specific to the doctor appointment reminder. For example, the ring that is specific to the birthday event reminder may be a ring based on the song "Happy Birthday to You" while the ring that is specific to the doctor appointment reminder may be a ring based on the song "Doctor Doctor" by the Thompson Twins.

At block 218, the telephone may detect an off-hook condition. Then at block 220, the telephone may automatically call a telephone number associated with the event. The automatic call at block 220 may be in response to detecting the off-hook condition at block 218 while the event reminder presented at block 216 remains presented on the display associated with the telephone.

Continuing with the above birthday example and the above doctor appointment example, at block 218 the telephone 110 may detect an off-hook condition. The off-hook condition may be a condition in which the handset 124 of the telephone 110 has been removed by the user 116 or the user 118 from the switch hook 126 of the telephone 110. Alternatively, the off-hook condition may be a condition in which a speakerphone button of the telephone 110 has been pressed by the user 116 or the user 118. Then at block 220 the telephone 110 may automatically call a telephone number of the granddaughter or of the doctor in response to detecting the off-hook condition at block 218 while the birthday reminder or the doctor appointment reminder that was presented at block 216 remains presented on the display associated with the telephone 110, such as the visual display 120 of the telephone 110 or the display of the wearable device 122 that is in wireless communication with the telephone 110.

In this manner, the user 118 or the user 116 may be automatically enabled to participate in a call with the granddaughter on her birthday or a call with the doctor for the doctor appointment without having to travel to the remote location of the birthday celebration or the doctor appointment. This remote participation may be achieved by simply removing the handset 124 of the telephone 110 from the switch hook 126 of the telephone 110 while the birthday reminder or the doctor appointment reminder remains presented on the display associated with the telephone 110, and without requiring the user 118 or the user 116 to remember the birthday or the doctor appointment and without requiring the user 118 or the user 116 to manually dial the telephone number of the granddaughter or the doctor.

It is understood that, for this and other processes, operations, and methods disclosed herein, the functions and/or operations performed may be implemented in differing order. Furthermore, the outlined functions and operations are only provided as examples, and some of the functions and operations may be optional, combined into fewer functions and operations, or expanded into additional functions and operations without detracting from the essence of the disclosed embodiments.

For example, in some embodiments, the block 202 may be performed by a user associated with the telephone of blocks 208-220 and/or performed using the telephone of blocks 208-220. For example, the user of the telephone of blocks 208-220 may send the event data to his or her own telephone and/or may send the event data using his or her own telephone. Additionally or alternatively, the blocks 210 and 212 may be omitted resulting in the block 214 following the block 208. For example, the event data received at block 208 may be stored at block 214 without presenting the option to accept or reject the option at block 210. Additionally or alternatively, the blocks 202-212 may be omitted. For example, the event data may be created and stored at block 214 locally at the telephone of blocks 214-220 without involving the device of block 202 or the server of blocks 204-206.

Additionally or alternatively, the detection at block 218 may be performed by the server of blocks 204-206. For example, the off-hook condition at block 218 may be remotely detected by the server of blocks 204-206 instead of being locally detected by the telephone of blocks 208-220. Additionally or alternatively, the event data in any of the blocks 202-208 or 212-214 may be updated to modify any portion of the event data. For example, the event data may be updated to change the event date, the event time, the telephone number, or the contact associated with the event. Additionally or alternatively, the automatic calling of a telephone number at block 220 may involve the automatic establishment of any type of communication session, such as a telephone call, a video call, a voice-over-internet-protocol call, or other communication session. For example, instead of a telephone call, at block 220 a video call may be automatically established between a user of the telephone of block 220 and another user by automatically contacting the other user using a video call identifier associated with the event, such as a Skype® name of the other user that is associated with the event or other video call identifier.

Further, it is understood that the method 200 may improve the functioning of a telephone itself. For example, the functioning of the telephone 110 of FIG. 1 may itself be improved by the method 200 at least because the telephone 110 may be configured to remind a user of an event and then automatically make a phone call associated with the event. For example the method 200 may be employed to present an event reminder on a display associated with the telephone 110, and a telephone number associated with the event may then be automatically called by the telephone 110 in response to detecting an off-hook condition at the telephone 110. In this manner, the user 116 or the user 118 may be automatically enabled to participate in the event telephonically, without having to be physically present for the event, by, for example, simply removing the handset 124 of the telephone 110 from the switch hook 126 of the telephone 110 while the event reminder remains presented on the display associated with the telephone 110, and without requiring the user to manually dial the telephone number associated with the event, unlike prior art telephones which did not remind a user of an event and required a user to manually dial telephone numbers in order to participate in telephone calls.

Also, the method 200 may improve the technical field of telecommunications. For example, the technical field of telecommunications may be improved by the method 200 at least because prior art telephones did not enable automatic calling of a telephone number associated with an event in response to detecting an off-hook condition at the telephone while an event reminder remains presented on a display associated with the telephone. The ability to remind a user of an event and then automatically make a phone call associated with the event may avoid missed telephone calls for a user who either has difficulty remembering that the call needs to take place or has difficulty making the call even after the user is reminded of the need to make the call.

Figure 3:
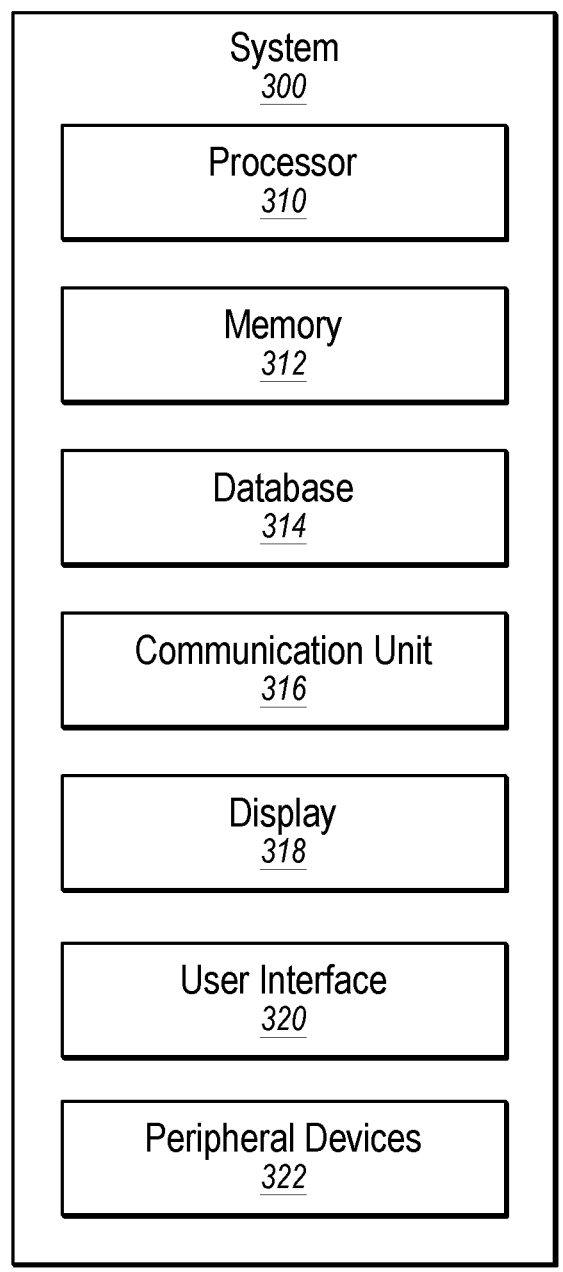
FIG. 3 illustrates an example computing system that may be used in automatically establishing a communication session associated with an event.

FIG. 3 illustrates an example computing system 300 that may be used in automatically establishing a communication session associated with an event. The system 300 may be arranged in accordance with at least one embodiment described in the present disclosure. The system 300 may include a processor 310, a memory 312, a database 314, a communication unit 316, a display 318, a user interface unit 320, and a peripheral device 322, which all may be communicatively coupled. In some embodiments, the system 300 may be part of any of the systems or devices described in this disclosure. For example, the system 300 may be part of any of the devices 104 and 106, the telephone 110, or the system 108 of FIG. 1.

Generally, the processor 310 may include any suitable special-purpose or general-purpose computer, computing entity, or processing device including various computer hardware or software modules and may be configured to execute instructions stored on any applicable computer-readable storage media. For example, the processor 310 may include a microprocessor, a microcontroller, a digital signal processor (DSP), an application-specific integrated circuit (ASIC), a Field-Programmable Gate Array (FPGA), or any other digital or analog circuitry configured to interpret and/or to execute program instructions and/or to process data, or any combination thereof.

Although illustrated as a single processor in FIG. 3, it is understood that the processor 310 may include any number of processors distributed across any number of networks or physical locations that are configured to perform individually or collectively any number of operations described herein. In some embodiments, the processor 310 may interpret and/or execute program instructions and/or process data stored in the memory 312, the database 314, or the memory 312 and the database 314. In some embodiments, the processor 310 may fetch program instructions from the database 314 and load the program instructions into the memory 312.

After the program instructions are loaded into the memory 312, the processor 310 may execute the program instructions. For example, the system 300 may be part of the device 104, the device 106, the system 108, or the telephone 110 of FIG. 1. In these and other embodiments, the instructions may include the processor 310 automatically making a telephone call associated with an event.

The memory 312 and the database 314 may include computer-readable storage media for carrying or having computer-executable instructions or data structures stored thereon. Such computer-readable storage media may be any available media that may be accessed by a general-purpose or special-purpose computer, such as the processor 310. By way of example, and not limitation, such computer-readable storage media may include non-transitory computer-readable storage media including Read-Only Memory (ROM), Electrically Erasable Programmable Read-Only Memory (EEPROM), Compact Disc Read-Only Memory (CD-ROM) or other optical disk storage, magnetic disk storage or other magnetic storage devices, flash memory devices (e.g., solid state memory devices), or any other storage media which may be used to carry or store desired program code in the form of computer-executable instructions or data structures and which may be accessed by a general-purpose or special-purpose computer. Combinations of the above may also be included within the scope of computer-readable storage media. Computer-executable instructions may include, for example, instructions and data configured to cause the processor 310 to perform a certain operation or group of operations, such as one or more blocks of the method 200.

The communication unit 316 may include any component, device, system, or combination thereof that is configured to transmit or receive information over a network. In some embodiments, the communication unit 316 may communicate with other devices at other locations, the same location, or even other components within the same system. For example, the communication unit 316 may include a modem, a network card (wireless or wired), an infrared communication device, a wireless communication device (such as an antenna), and/or chipset (such as a Bluetooth device, an 802.6 device (e.g., Metropolitan Area Network (MAN)), a WiFi device, a WiMax device, cellular communication facilities, etc.), plain old telephone service (POTS), and/or the like. The communication unit 316 may permit data to be exchanged with a network and/or any other devices or systems described in the present disclosure.

The display 318 may be configured as one or more displays, like an LCD, LED, or other type display. The display 318 may be configured to present video, text captions, user interfaces, and other data as directed by the processor 310.

The user interface unit 320 may include any device to allow a user to interface with the system 300. For example, the user interface unit 320 may include a mouse, a track pad, a keyboard, a touchscreen, a telephone switch hook, and/or a telephone keypad, among other devices. The user interface unit 320 may receive input from a user and provide the input to the processor 310.

The peripheral devices 322 may include one or more devices. For example, the peripheral devices may include a microphone, an imager, and/or a speaker, among other peripheral devices. In these and other embodiments, the microphone may be configured to capture audio. The imager may be configured to capture digital images. The digital images may be captured in a manner to produce video or image data. In some embodiments, the speaker may broadcast audio received by the system 300 or otherwise generated by the system 300.

Modifications, additions, or omissions may be made to the system 300 without departing from the scope of the present disclosure.

As indicated above, the embodiments described herein may include the use of a special purpose or general purpose computer (e.g., the processor 310 of FIG. 3) including various computer hardware or software modules, as discussed in greater detail below. Further, as indicated above, embodiments described herein may be implemented using computer-readable media (e.g., the memory 312 or database 314 of FIG. 3) for carrying or having computer-executable instructions or data structures stored thereon.

In some embodiments, the different components, modules, engines, and services described herein may be implemented as objects or processes that execute on a computing system (e.g., as separate threads). While some of the systems and methods described herein are generally described as being implemented in software (stored on and/or executed by general purpose hardware), specific hardware implementations or a combination of software and specific hardware implementations are also possible and contemplated.

In accordance with common practice, the various features illustrated in the drawings may not be drawn to scale. The illustrations presented in the present disclosure are not meant to be actual views of any particular apparatus (e.g., device, system, etc.) or method, but are merely idealized representations that are employed to describe various embodiments of the disclosure. Accordingly, the dimensions of the various features may be arbitrarily expanded or reduced for clarity. In addition, some of the drawings may be simplified for clarity. Thus, the drawings may not depict all of the components of a given apparatus (e.g., device) or all operations of a particular method.

Terms used herein and especially in the appended claims (e.g., bodies of the appended claims) are generally intended as "open" terms (e.g., the term "including" should be interpreted as "including, but not limited to," the term "having" should be interpreted as "having at least," the term "includes" should be interpreted as "includes, but is not limited to," etc.).

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

In addition, even if a specific number of an introduced claim recitation is explicitly recited, it is understood that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." or "one or more of A, B, and C, etc." is used, in general such a construction is intended to include A alone, B alone, C alone, A and B together, A and C together, B and C together, or A, B, and C together, etc. For example, the use of the term "and/or" is intended to be construed in this manner.

Further, any disjunctive word or phrase presenting two or more alternative terms, whether in the description, claims, or drawings, should be understood to contemplate the possibilities of including one of the terms, either of the terms, or both terms. For example, the phrase "A or B" should be understood to include the possibilities of "A" or "B" or "A and B."

Additionally, the use of the terms "first," "second," "third," etc., are not necessarily used herein to connote a specific order or number of elements. Generally, the terms "first," "second," "third," etc., are used to distinguish between different elements as generic identifiers. Absence a showing that the terms "first," "second," "third," etc., connote a specific order, these terms should not be understood to connote a specific order. Furthermore, absence a showing that the terms first," "second," "third," etc., connote a specific number of elements, these terms should not be understood to connote a specific number of elements. For example, a first widget may be described as having a first side and a second widget may be described as having a second side. The use of the term "second side" with respect to the second widget may be to distinguish such side of the second widget from the "first side" of the first widget and not to connote that the second widget has two sides.

All examples and conditional language recited herein are intended for pedagogical objects to aid the reader in understanding the invention and the concepts contributed by the inventor to furthering the art, and are to be construed as being without limitation to such specifically recited examples and conditions. Although embodiments of the present disclosure have been described in detail, it should be understood that the various changes, substitutions, and alterations could be made hereto without departing from the spirit and scope of the present disclosure.

What is claimed is:

1. A method for automatically making a telephone call associated with an event, the method comprising:
   receiving, at a server, event data associated with a user profile from an individual that is different from a user associated with the user profile, the event data including a date associated with an event, a time associated with the event, and a telephone number associated with the event;

sending, from the server, the event data to a telephone associated with the user profile;

storing, at the telephone, the event data;

presenting, on a display associated with the telephone, an event reminder on the date associated with the event and at the time associated with the event;

ringing the telephone with a ring that is specific to the event reminder on the date associated with the event and at the time associated with the event; and in response to detecting an off-hook condition at the telephone while the event reminder remains presented on the display associated with the telephone, automatically calling, from the telephone, the telephone number associated with the event.

2. The method of claim 1, wherein:

the method further comprises presenting, on the display associated with the telephone, an option to accept or reject the event; and the presenting, on the display associated with the telephone, of the event reminder is performed in response to detecting a selection by a user of the telephone of the option to accept the event.

3. The method of claim 1, wherein the display associated with the telephone includes a visual display that is integral with the telephone.

4. The method of claim 1, wherein the display associated with the telephone includes a visual display that is physically separate from the telephone and is in wireless communication with the telephone.

5. At least one non-transitory computer readable media configured to store one or more instructions that when executed by at least one computing system performs the method of claim 1.

6. A method for automatically making a telephone call associated with an event, the method comprising:

receiving, at a system, event data associated with a user profile from an individual that is different from a user associated with the user profile, the event data including a date associated with an event, a time associated with the event, and a telephone number associated with the event;

sending, from the system to a telephone, the event data associated with the user profile, the telephone identified by a profile telephone number associated with the user profile, the profile telephone number being different than the telephone number associated with the event;

presenting, prior to the date associated with the event and the time associated with the event and on a display associated with the telephone, an option to accept or reject the event along with an option to immediately call the telephone number associated with the event;

in response to detecting a selection by the user of the telephone of the option to accept the event, storing, at the telephone, the event data;

accessing, at the telephone, the event data;

in response to detecting a selection by a user of the telephone of the option to accept the event, presenting, on a display associated with the telephone, an event reminder on the date associated with the event and at the time associated with the event, the event reminder including a non-textual graphical reminder showing one or more non-textual graphics related to the event;

ringing the telephone with a ring that is specific to the event reminder on the date associated with the event and at the time associated with the event;

in response to detecting that a handset associated with the telephone has been lifted off of a switch hook associated with, automatically calling, by the telephone, the telephone number associated with the event, the event reminder remaining presented on the display during the automatically calling of the telephone number;

in response to automatically calling the telephone number, establishing a communication session between the telephone and a device associated with the telephone number;

obtaining a transcription, generated by the system, of the communication session; and presenting the transcription of the communication session on the display associated with the telephone.

7. The method of claim 6, wherein the display associated with the telephone includes a visual display that is integral with the telephone and that is configured to present text captions.

8. The method of claim 6, wherein the display associated with the telephone includes a visual display of a wearable device that is physically separate from the telephone and is in wireless communication with the telephone.

9. The telephone of claim 6, comprising:

a computing system including the switch hook and the handset; and at least one non-transitory computer-readable media configured to store one or more instructions that when executed by the computing system performs the method of claim 6.

10. A telephone comprising:

a display;

a switch hook configured to establish an off-hook condition of the telephone;

a handset configured to rest on the switch hook;

a processor communicatively coupled to the display; and at least one non-transitory computer-readable media communicatively coupled to the processor and configured to store one or more instructions that in response to being executed by the processor result in the telephone performing operations, the operations comprising:

accessing event data, the event data including a date associated with an event, a time associated with the event, and a telephone number associated with the event;

presenting, on the display, an event reminder on the date associated with the event and at the time associated with the event;

ringing the telephone with a ring that is specific to the event reminder; and in response to detecting that the handset has been lifted off of the switch hook while the event reminder remains presented on the display, automatically calling the telephone number associated with the event.

11. The telephone of claim 10, wherein the operations further comprise:

presenting, on the display and prior to the date associated with the event and the time associated with the event, an option to accept or reject the event; and the presenting, on the display, of the event reminder is performed in response to detecting, prior to the date associated with the event and the time associated with the event, a selection by a user of the telephone of the option to accept the event.

12. The telephone of claim 10, wherein the operations further comprise:
   presenting, on the display and prior to the date associated with the event and the time associated with the event, an option to accept or reject the event along with an option to immediately call the telephone number associated with the event; and
   in response to detecting, prior to the date associated with the event and the time associated with the event, a selection by a user of the telephone of the option to immediately call the telephone number associated with the event, automatically calling the telephone number associated with the event.

13. The telephone of claim 10, wherein the display includes a visual display that is integral with the telephone and that is configured to present text captions.

14. The telephone of claim 10, wherein the presenting, on the display, of the event reminder further includes sending the event reminder to a wrist-wearable device that is physically separate from the telephone and is in wireless communication with the telephone for display by the wrist-wearable device of the event reminder.

15. The telephone of claim 10, wherein the event data further includes a contact associated with the event; and the operations further comprise
   associating the contact associated with the event with a contact in a contact list associated with the telephone.

16. The method of claim 1, further comprising:
   in response to automatically calling the telephone number, establish a communication session between the telephone and a device associated with the telephone number;
   obtain a transcription of the communication session; and
   present the transcription of the communication session on the display associated with the telephone.

17. The telephone of claim 10, wherein the operations further comprise:
   in response to automatically calling the telephone number, establishing a communication session between the telephone and a device associated with the telephone number;
   obtaining a transcription of the communication session; and
   presenting the transcription of the communication session on the display.

* * * * *